United States Patent
Soddemann et al.

(10) Patent No.: US 8,952,099 B2
(45) Date of Patent: Feb. 10, 2015

(54) VULCANIZABLE POLYMER COMPOSITIONS

(75) Inventors: Matthias Soddemann, Rösrath (DE); Martin Mezger, Burscheid (DE); Christopher Ong, Orange, TX (US); Sven Brandau, Dormagen (DE); Michael Klimpel, La Wantzenau (FR)

(73) Assignee: LANXESS Deutschland GmbH, Cologne (DE)

( * ) Notice: Subject to any disclaimer, the term of this patent is extended or adjusted under 35 U.S.C. 154(b) by 1161 days.

(21) Appl. No.: 12/496,953

(22) Filed: Jul. 2, 2009

(65) Prior Publication Data
US 2010/0029857 A1 Feb. 4, 2010

(30) Foreign Application Priority Data

Jul. 15, 2008 (EP) .................................. 08012767

(51) Int. Cl.
*C08F 214/18* (2006.01)
*C08F 236/02* (2006.01)
*C08K 5/3465* (2006.01)
*C08K 5/17* (2006.01)
*C08L 9/02* (2006.01)
*C08L 13/00* (2006.01)
*C08L 15/00* (2006.01)
*C08L 101/08* (2006.01)

(52) U.S. Cl.
CPC ................. *C08K 5/3465* (2013.01); *C08K 5/17* (2013.01); *C08L 9/02* (2013.01); *C08L 13/00* (2013.01); *C08L 15/005* (2013.01); *C08L 101/08* (2013.01)
USPC ..................... 525/326.3; 525/329.3

(58) Field of Classification Search
USPC .......... 525/331.9, 332.5, 332.7, 326.1, 327.4, 525/327.6, 326.3, 329.3
See application file for complete search history.

(56) References Cited

U.S. PATENT DOCUMENTS

| 2,726,224 | A | 12/1955 | Peterson et all ................. 260/38 |
| 3,700,637 | A | 10/1972 | Finch, Jr. ..................... 260/83.3 |
| 4,464,515 | A | 8/1984 | Rempel et al. ................ 525/338 |
| 4,465,542 | A | 8/1984 | Furihata |
| 4,503,196 | A | 3/1985 | Rempel et al. ................ 525/338 |
| 4,581,417 | A | 4/1986 | Buding et al. ................ 525/338 |
| 4,631,315 | A | 12/1986 | Buding et al. ................ 525/338 |
| 4,746,707 | A | 5/1988 | Fiedler et al. ................ 525/338 |
| 4,812,528 | A | 3/1989 | Rempel et al. ................ 525/338 |
| 4,978,771 | A | 12/1990 | Fiedler ........................ 558/459 |
| 6,214,922 | B1 | 4/2001 | Campomizzi ................. 524/511 |
| 8,034,881 | B2 | 10/2011 | Ikeda et al. |
| 2002/0072557 | A1 | 6/2002 | Arnoldi et al. ................ 524/323 |

FOREIGN PATENT DOCUMENTS

| DE | 25 39 132 | | 3/1977 |
| EP | 0 943 657 | | 9/1999 |
| EP | 0 943 657 | A2 * | 9/1999 |
| EP | 1 234 851 | A1 * | 8/2002 |
| EP | 1 234 851 | | 5/2004 |
| EP | 1672016 | A1 | 6/2006 |
| EP | 1 964 882 | | 9/2008 |
| EP | 2098567 | A1 | 9/2009 |
| GB | 1 558 491 | | 8/1976 |
| JP | 2007063429 | A | 3/2007 |
| JP | 2008056793 | | 3/2008 |
| WO | 2007049651 | A1 | 5/2007 |
| WO | 2007/072900 | | 6/2007 |

OTHER PUBLICATIONS

Tao et al; Rubber Chem. Tech. (2005), 78(3), pp. 489-515; "Heat Resistant Elastomers".
European Search Report for Application No. 0812767.3 dated Jan. 5, 2009.

* cited by examiner

*Primary Examiner* — Ling Choi
*Assistant Examiner* — Chun-Cheng Wang
(74) *Attorney, Agent, or Firm* — Jennifer R. Seng

(57) ABSTRACT

A novel vulcanizable polymer composition is provided which is characterized by a specific combination of a polyamine crosslinking agent and a particular crosslinking accelerator. Furtheron polymer vulcanizates on the basis of such polymer compositions as well as method for preparing such polymer vulcanizate is provided, in particular in the form of mouldings or shaped parts.

32 Claims, No Drawings

VULCANIZABLE POLYMER COMPOSITIONS

FIELD OF THE INVENTION

The present invention relates to an vulcanizable polymer composition, a polymer vulcanizate obtained from such polymer composition and to a process for the production thereof.

BACKGROUND OF THE INVENTION

The negative effects of oxidizing conditions on vulcanizates obtained from polymers having carbon-carbon double bond unsaturation have long been a problem, particularly in applications where the vulcanizates are exposed to elevated temperatures for extended periods of time. A variety of approaches have been developed in the art in an attempt to solve this problem.

It is known that the carbon-carbon double bonds of such polymers activate the vulcanizate to oxidative attack. One solution to the problem of oxidative attack is to use polymers with few or no carbon-carbon double bonds. Examples of such polymers include butyl rubber (copolymers of isobutylene and isoprene) which typically contain from about 0.5 to about 3.0 mole percent of carbon-carbon double bond unsaturation, and ethylene-propylene copolymers which contain no such unsaturation.

Certain applications, such as the various hoses and seals in the engine compartment of automobiles, require vulcanized polymers with a combination of oil resistance, and resistance to oxidative attack in air at elevated temperatures for extended periods of time. Vulcanizates of copolymers of conjugated dienes and $\alpha,\beta$-unsaturated nitriles, such as acrylonitrile-butadiene copolymers, commonly known as "nitrile rubbers" or "NBR", are well known for their oil resistance. However, they contain carbon-carbon double bond unsaturation and therefore are susceptible to oxidative attack unless subjected to special compounding procedures for the production of oxidation resistant vulcanizates.

In order to reduce the amount of carbon-carbon double bond unsaturation in NBR and yet retain the copolymer's oil resistance which is thought to be provided by the nitrile functional groups in the copolymer, methods have been developed to selectively hydrogenate the carbon-carbon double bond unsaturation of NBR without hydrogenating the nitrile groups to produce hydrogenated NBR or HNBR.

See for example, GB-A-1,558,491, the contents of which are hereby incorporated by reference. A further review by Tan et al. Rubber Chem. Tech. (2005), 78(3), 489-515 gives a comprehensive overview of this technical field.

While the development of HNBR represents a significant advance in the art, there is still room for improvement.

In U.S. Pat. No. 6,214,922 it is disclosed that the usage of a combination of antioxidants together with bases significantly improves the hot air aging characteristics of hydrogenated nitrite vulcanizates. One preferred combination includes the usage of sodium carbonate which provides good results.

In US 2002/072557 A1 it is further disclosed to use antiaging agents for organic polymers based on salts of sterically hindered phenolic compounds with at least two phenolic OH groups.

In WO-A-2007/072900 it has been shown that compression set values of a nitrite rubber may be improved by using an aromatic secondary amine antiaging agent and a polyamine crosslinking agent together with a nitrite rubber containing $\alpha,\beta$-ethylenically unsaturated dicarboxylic acid monoester monomer units.

In JP 2008-056793 A a crosslinkable nitrite rubber composition having an improved tensile stress and scorching stability is disclosed containing a crosslinking agent and a highly saturated nitrite rubber having $\alpha,\beta$-ethylenically unsaturated nitrite monomeric units and, $\alpha,\beta$-ethylenically unsaturated dicarboxylic acid monoester monomeric units having one carboxyl group on each of the two carbon atoms forming the $\alpha,\beta$-ethylenically unsaturated bond, and wherein the time tc(90) corresponding to 90% vulcanization is at least five minutes. The $\alpha,\beta$-ethylenically unsaturated dicarboxylic acid monoester monomer is preferably a maleic acid mono n-butyl ester monomeric unit or a fumaric acid mono-n-butyl ester unit. As crosslinking agent contained in the crosslinkable nitrite rubber compositions polyamine compounds are preferred. The compositions may additionally contain a crosslinking promoter. DOTG (Di-o-tolyl guanidin) is the only crosslinking promoter mentioned.

EP 1 234 851 A1 discloses a crosslinkable rubber composition comprising a nitrite group-containing highly saturated copolymer rubber containing repeating units of an ethylenically unsaturated dicarboxylic acid monalkyl ester monomer, a polyamine crosslinking agent, and a basic crosslinking accelerator being a guanidine crosslinking accelerator such as tetramethylguanidine, tetraethylguanidine, diphenylguanidine, d-o-tolylguanidine, o-tolylbiguanidine and a di-o-tolylguadinine salt of dicathecolboric acid; or aldehydeamine crosslinking accelerators such as n-butylaldehydeaniline, acetaldehydeammonnia and hexamethylenetetramine. Of these, guanidine crosslinking accelerators are preferred. According to all examples in EP 1 234 851 A1 DOTG is used as crosslinking accelerator.

The latter two references show, that even though the vulcanizates mentioned in the prior art are very useful for improved long term compression set values, for an optimized crosslinking reaction a strong organic base as e.g. 3-di-o-tolyl guanidine (DOTG) is needed.

Caused by the toxicity of DOTG the use of a curing system containing this crosslinking accelerator is restricted in use for certain applications.

Hence, there was a need to develop and provide novel vulcanizable polymer compositions avoiding the use of toxic components and in particular toxic cross-linking accelerators and to further provide polymer vulcanizates based on such polymer compositions, which vulcanizates should show improved physical properties such as hot air aging and a low compression set and simultaneously still have a lower toxicity. It is yet another object of the present invention to provide a novel process for producing said novel polymer vulcanizates.

SUMMARY OF THE INVENTION

These objects have been solved by providing a novel vulcanizable polymer composition wherein besides the polymer component a combination of a polyamine crosslinking agent and a specific crosslinking accelerator containing at least one bi- or polycyclic aminic base is used.

Accordingly, the present invention provides a vulcanizable polymer composition comprising
(i) a polymer having a main polymer chain derived from
  (ia) at least 25% by weight to 100% by weight, preferably 25 to 85% by weight, more preferably 30 to 80% by weight, and particularly preferably 45 to 75% by weight based on the polymer, of a first monomer which introduces at least one of a secondary carbon and a tertiary carbon to the main polymer chain, preferably at least one diene monomer, and (ib) in the range of from 0 to 74.9% by weight, preferably 10 to 60% by weight, more preferably 15 to 55% by weight, particularly preferably 20 to 50% by weight based on the polymer, of at least a second monomer, preferably an α,β-ethylenically unsaturated nitrile monomer;

(ic) in the range of from 0.1 to 20% by weight, preferably 0.5 to 20% by weight, more preferably 1 to 15% by weight, particularly preferably 1.5 to 10% by weight based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, wherein the sum of all monomer units mentioned under (ia), (ib) and (ic) is 100% by weight;

(ii) at least one polyamine crosslinking agent, and (iii) at least one bi- or polycyclic aminic base.

DETAILED DESCRIPTION OF THE INVENTION

In a further embodiment the present invention provides a vulcanizable polymer composition comprising (i) a polymer having a main polymer chain derived from (ia) at least 25% by weight to 99.9% by weight, preferably 25 to 89.5% by weight based on the polymer, of a first monomer which introduces at least one of a secondary carbon and a tertiary carbon to the main polymer chain, preferably at least one diene monomer, and (ib) in the range of from 0 to 74.9% by weight, preferably 10 to 60% by weight based on the polymer, of at least a second monomer, preferably an α,β-ethylenically unsaturated nitrile monomer;

(ic) in the range of from 0.1 to 20% by weight, preferably 0.5 to 20% by weight based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, wherein the sum of all monomer units mentioned under (ia), (ib) and (ic) is 100% by weight;

(ii) at least one polyamine crosslinking agent, and (iii) at least one bi- or polycyclic aminic base.

In a preferred embodiment the present invention provides a polymer composition comprising:

(i) a polymer having a main polymer chain derived from (ia) at least 25% by weight to 100% by weight, preferably 25 to 85% by weight, more preferably 30 to 80% by weight, particularly preferably 45 to 75% by weight based on the polymer, of a first monomer which introduces at least one of a secondary carbon and a tertiary carbon to the main polymer chain, preferably at least one diene monomer, and (ib) in the range of from 0 to 74.9% by weight, preferably 10 to 60% by weight, more preferably 15 to 55% by weight, particularly preferably 20 to 50% by weight based on the polymer, of at least a second monomer, preferably an α,β-ethylenically unsaturated nitrile monomer;

(ic) in the range from 0.1 to 20% by weight, preferably 0.5 to 20% by weight, more preferably 1 to 15% by weight, particularly preferably 1.5 to 10% by weight based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, wherein the sum of all monomer units mentioned under (ia), (ib) and (ic) is 100% by weight;

(ii) at least one polyamine crosslinking agent, and (iii) at least one bi- or polycyclic aminic base which is selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

In a further preferred embodiment the present invention provides a polymer composition comprising:

(i) a polymer having a main polymer chain derived from (ia) at least 25% by weight to 99.9% by weight, preferably 25 to 89.5% by weight based on the polymer, of a first monomer which introduces at least one of a secondary carbon and a tertiary carbon to the main polymer chain, preferably at least one diene monomer, and (ib) in the range of from 0 to 74.9% by weight, preferably 10 to 60% by weight based on the polymer, of at least a second monomer, preferably an α,β-ethylenically unsaturated nitrile monomer;

(ic) in the range from 0.1 to 20% by weight, preferably 0.5 to 20% by weight based on the polymer of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, wherein the sum of all monomer units mentioned under (ia), (ib) and (ic) is 100% by weight;

(ii) at least one polyamine crosslinking agent, and (iii) at least one bi- or polycyclic aminic base which is selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

Optionally the polymer compositions according to the invention additionally comprise at least one antioxidant as component (iv) and at least one filler as component (v).

A particularly preferred polymer composition according to the present invention comprises:

(i) an optionally hydrogenated nitrile polymer derived from (ia) at least one conjugated diene, (ib) at least one α,β-unsaturated nitrile, and (ic) at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as third monomer, (ii) at least one polyamine crosslinking agent, (iii) at least one bi- or polycyclic aminic base, which is in particular selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives;
(iv) optionally at least one antioxidant, and
(v) optionally at least one filler.

The novel vulcanizable polymer composition disposes of the advantage of having a substantially reduced toxicity due to the use of a bi- or polycyclic aminic base as crosslinking accelerator.

It is yet another object of the present invention to provide a method for vulcanizing such vulcanizable polymer compositions to obtain novel polymer vulcanizates.

Choosing this specific combination of at least one polyamine crosslinking agent and at least one bi- or polycyclic aminic base in combination with the polymer (i) allows to provide a novel method for improving the curing process of such polymer compositions and at the same time polymer vulcanizates with excellent characteristics are obtained. On the one hand the polymer vulcanizates dispose of a lowered toxicity due to the use of the less toxic crosslinking accelerator, too, and on the other hand they show improved physical and mechanical properties, e.g. the curing density is increased, the hot air aging characteristics are improved, modulus 100 is improved, tensile strength is increased and the compression set is lowered.

Thus, it has been discovered that incorporation of a particular combination of a bi- or polycyclic aminic base, preferably selected from the group consisting of 1,8-Diazabicyclo [5.4.0]undec-7-en (DBU), 1,5-Diazabicyclo[4.3.0]-5-nonen (DBN), 1,4-Diazabicyclo[2.2.2]octan (DABCO), 1,5,7-triazabicyclo[4.4.0]dec-5-ene (TPD), 7-methyl-1,5,7-triazabicyclo[4.4.0]dec-5-ene (MTPD) and its derivatives and a polyamine crosslinking agent in a polymer composition results in an improvement in crosslinking density and surprisingly and unexpectedly at the same time in an improvement of the mechanical values even though a lower concentration of the crosslinking accelerator is used compared to the prior art in which DOTG has been used so far. The improvement in mechanical properties can manifest itself in a number of ways, including (by way of example only) an increase in: (i) curing density measured with the vulcanizing curve; (ii) higher values in the modulus 100, and (iii) improved compression set values, when compared to a vulcanizate made without the strong organic base (which in the meaning of the present invention is the bi- or polycyclic aminic base, preferably 1,8-Diazabicyclo[5.4.0]undec-7-en (DBU), 1,5-Diazabicyclo[4.3.0]-5-nonen (DBN), 1,4-Diazabicyclo[2.2.2]octan (DABCO), 1,5,7-triazabicyclo[4.4.0]dec-5-ene (TPD), 7-methyl-1,5,7-triazabicyclo[4.4.0]dec-5-ene (MTPD) or its derivatives). The present vulcanizates may also be characterized by improvement (i.e., in comparison to a vulcanizate produced without or with a different strong organic base) in one or more of the following properties: aged hot air aging, aged hot fluid aging, aged compression set, aged dynamic elastic modulus (E'), aged dynamic viscous modulus (E"), aged static modulus, aged low temperature properties, aged hardness and toxicology.

Vulcanizable Polymer Compositions:
First Component (i):

The first component (i) of the present polymer composition is a polymer having a main polymer chain derived from:
(ia) at least 25% by weight to 100% by weight, preferably 25 to 85% by weight, more preferably 30 to 80% by weight, particularly preferably 45 to 75% by weight based on the polymer, of a first monomer which introduces at least one of a secondary carbon and a tertiary carbon to the main polymer chain, preferably at least one diene monomer, and
(ib) in the range of from 0% to 74.9% by weight, preferably 10 to 60% by weight, more preferably 15 to 55% by weight, particularly preferably 20 to 50% by weight based on the polymer, of at least a second monomer, preferably an α,β-ethylenically unsaturated nitrile monomer;
(ic) in the range from 0.1 to 20% by weight, preferably 0.5 to 20% by weight, more preferably 1 to 15% by weight, particularly preferably 1.5 to 10% by weight based on the polymer, of at least an α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer,
wherein the sum of all monomer units mentioned under (ia), (ib) and (ic) is 100% by weight;

In a further embodiment the first component (i) of the present polymer composition is a polymer having a main polymer chain derived from:
(ia) at least 25% by weight to 99.9% by weight, preferably 25 to 89.5% by weight based on the polymer, of a first monomer which introduces at least one of a secondary carbon and a tertiary carbon to the main polymer chain, preferably at least one diene monomer, and
(ib) in the range of from 0% to 74.9% by weight, preferably 10 to 60% by weight based on the polymer, of at least a second monomer, preferably an α,β-ethylenically unsaturated nitrile monomer;
(ic) in the range from 0.1 to 20% by weight, preferably 0.5 to 20% by weight based on the polymer, of at least an α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer,
wherein the sum of all monomer units mentioned under (ia), (ib) and (ic) is 100% by weight;

As used throughout this specification, the term "polymer" with regard to polymer (i) is intended to have a broad meaning and is meant to encompass any polymer as long as it is derived from the above mentioned monomer types (ia) and (ic). In one embodiment of the present invention the first component (i) is a polymer which is derived from the above three mentioned monomer types (ia), (ib) and (ic) and therefore represents a terpolymer.

The first monomer (ia) gives rise to a main polymer chain which comprises at least one secondary or tertiary carbon. Those skilled in the art understand that a secondary carbon is a carbon atom having two hydrogen atoms bonded to it while a tertiary carbon is a carbon atom having one hydrogen atom bonded to it.

In an alternative embodiment of the present invention it is also possible to use a mixture of polymers provided at least one polymer in the mixture complies with the definition give above.

The polymer suitable for use herein may be an elastomer (e.g. a hydrocarbon rubber), a graft polymer or block polymer derived from monomers (ia) and (ic) each having at least one ethylenically unsaturated bond and polymerizable through this unsaturation.

In the first component of polymer (i) the monomer units (ia) may be formed from an α-olefin monomer which is preferably an α-olefin of a carbon number in the range of from 2 to 12, preferably ethylene, propylene, 1-butene, 4-methyl-1-pentene, 1-hexene, and 1-octene.

Preferably, the polymer (i) used in the present vulcanizable polymer composition is an elastomer.

Elastomers are well known to those of skilled in the art. Non-limiting examples of elastomers which represent a suitable basis for polymer (i) may be derived from natural rubber (NR), cis-1,4-polyisoprene rubber (IR), polybutadiene rubber (BR), styrene-butadiene rubber (SBR), ethylene-propylene monomer rubber (EPM), ethylene-propylene-diene monomer rubber (EPDM), ethylene-vinyl acetate rubber (EVM), epichloro hydrin rubber (ECO), however, always under the proviso that the aforementioned elastomer types have been modified as to contain also repeating units of monomer unit (ic). Under such proviso, and subject to compatibility, of course, mixtures of two or more of any of the foregoing elastomers may be used herein. More preferably, the elastomer is selected from the group consisting of an ethylene-propylene copolymer, ethylene-propylene-non conjugated diene terpolymer, ethylene-vinyl acetate copolymer, styrene/conjugated diene copolymer, hydrogenated styrene/conjugated diene copolymer, polyisoprene, natural rubber, polybutadiene and mixtures thereof, once more only under the proviso that the aforementioned elastomer types have been modified as to contain also repeating units of monomer unit (ic).

Nitrile Rubber and Hydrogenated Nitrite Rubber as First Component (i)

In an alternative embodiment an elastomer can be used as polymer (i) which represents a nitrile rubber or a hydrogenated nitrile rubber. As used throughout this specification, the term "nitrile rubber" as well as "hydrogenated nitrile rubber" is intended to have a broad meaning and is meant to encompass a optionally hydrogenated terpolymer comprising repeating units of at least one diene, either conjugated or not conjugated (as first monomer (ia)), at least one α,β-unsaturated nitrile (as second monomer (ib)) and at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer (ic). Additionally the optionally hydrogenated nitrile rubber may further contain one or more other copolymerisable monomers.

As the diene monomer serving as diene monomer unit (ia) a conjugated diene with a carbon number of at least 4 or preferably 4 to 6 carbon atoms may be used. Suitable conjugated dienes are e.g. 1,3-butadiene, isoprene, 2,3-dimethyl-1,3-butadiene, and 1,3-pentadiene; Suitable non-conjugated dienes typically have a carbon number in the range of from 5 to 12, preferably 1,4-pentadiene and 1,4-hexadiene may be used. Among these, a conjugated diene is preferred, and 1,3-butadiene is even more preferred.

The α,β-ethylenically unsaturated nitrile forming the second monomer (ib) of the nitrile rubber is not restricted as long as the said monomer is an α,β-ethylenically unsaturated compound containing a nitrile group. As such compounds, acrylonitrile, α-haloacrylonitriles such as α-chloro acrylonitrile and α-bromo acrylonitrile are suited; α-alkyl acrylonitriles such as methacrylonitrile or ethacrylonitrile may also be used. Among these, acrylonitrile and methacrylonitrile are preferred. A plurality of species of α,β-ethylenically unsaturated nitrile may be used together.

The content of α,β-ethylenically unsaturated nitrile monomer unit in such optionally hydrogenated nitrile rubber is typically in the range of from 10 to 60 wt. %, more preferably in the range of from 15 to 55 wt. % and particularly preferably in the range of from 20 to 50 wt. % with respect to 100 wt. % of all monomer units. If the content of α,β-ethylenically unsaturated nitrile monomer unit is chosen in the lower range, the oil resistance of the obtained rubber crosslinked material is decreasing, and conversely if the content is chosen too high, the cold resistance may be depressed.

In addition to the conjugated diene monomer units and the α,β-ethylenically unsaturated nitrile monomer units the optionally hydrogenated nitrile rubber must further contain at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer (ic).

As third monomer units (ic) α,β-ethylenically unsaturated dicarboxylic acid monoester monomer units are preferred. The tensile strength of the polymer vulcanizates obtained after crosslinking the polymer compositions according to the present invention tends to show an improvement as a result of using a nitrile rubber (i) whose structure contains α,β-ethylenically unsaturated dicarboxylic acid monoester monomer units (ic).

In the preferred process for introducing the monomer units (ic) and in particular α,β-ethylenically unsaturated dicarboxylic acid monoester monomer units into the nitrile rubber (i) monomer units (ic), and in particular the α,β-ethylenically unsaturated dicarboxylic acid monoester, is copolymerized with the aforesaid α,β-ethylenically unsaturated nitrile and the conjugated diene.

As the organic group of the α,β-ethylenically unsaturated dicarboxylic acid monoester monomer and the α,β-ethylenically unsaturated dicarboxylic acid diester monomer which is in each case bonded to the carbonyl group via an oxygen atom, an alkyl group, cycloalkyl group, alkyl cycloalkyl group or aryl group may be present, and among these an alkyl group is preferred. The carbon number of the alkyl group is typically in the range of from 1 to 10, preferably it is 2, 3, 4, 5 to 6. The carbon number of the cycloalkyl group is typically in the range of from 5 to 12, preferably in the range of from 6 to 10. The carbon number of the alkyl cycloalkyl group is preferably in the range of from 6 to 12, and more preferably in the range of from 7 to 10. If the carbon number of the organic group is too small, this might influence the processing stability of the obtained rubber composition, and conversely if too high, a slowing in the crosslinking rate and lowered crosslinked material mechanical strength may result.

Examples of the α,β-ethylenically unsaturated dicarboxylic acid monoester monomer include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;
fumaric acid monocycloalkyl esters, preferably monocyclopentyl fumarate, monocyclohexyl fumarate, and monocycloheptyl fumarate;
fumaric acid monoalkylcycloalkyl esters, preferably monomethylcyclopentyl fumarate, and monoethylcyclohexyl fumarate;
fumaric acid monoaryl ester, preferably monophenyl fumarate;
fumaric acid mono benzyl ester, preferably monobenzyl fumarate;
citraconic acid monoalkyl esters, preferably monomethyl citraconate, monoethyl citraconate, monopropyl citraconate, and mono n-butyl citraconate;
citraconic acid monocycloalkyl esters, preferably monocyclopentyl citraconate, monocyclohexyl citraconate, and monocycloheptyl citraconate;
citraconic acid monoalkylcycloalkyl esters, preferably monomethylcyclopentyl citraconate, and monoethylcyclohexyl citraconate;
citraconic acid mono aryl ester, preferably monophenyl citraconate;
citraconic acid mono benzyl ester, preferably monobenzyl citraconate;
itaconic acid mono alkyl esters, preferably monomethyl itaconate, monoethyl itaconate, monopropyl itaconate, and mono n-butyl itaconate;
itaconic acid monocycloalkyl esters, preferably monocyclopentyl itaconate, monocyclohexyl itaconate, and monocycloheptyl itaconate;
itaconic acid monoalkylcycloalkyl esters, preferably monomethylcyclopentyl itaconate, and monoethylcyclohexyl itaconate;
itaconic acid mono aryl ester, preferably monophenyl itaconate;
itaconic acid mono benzyl ester, preferably monobenzyl itaconate.
mesaconic acid monoalkyl ester, preferably mesaconic monoethyl ester;

As $\alpha,\beta$-ethylenically unsaturated dicarboxylic acid diester monomers the analogous diesters based on the above explicitely mentioned mono ester monomers may be used, wherein, however, the two organic groups linked to the C=O group via the oxygen atom may be identical or different.

Among these, from the point of having a lowering action on the compound Mooney viscosity (ML 1+4@100° C.) of the vulcanizable polymer composition, monoesters (mono alkyl ester, mono cycloalkyl ester and mono alkyl cycloalkyl ester) of dicarboxylic acid having carboxyl groups at each of the two carbon atoms forming the $\alpha,\beta$-ethylenically unsaturated bond such as maleic acid, fumaric acid, citraconic acid and the like are preferred, and monoesters of maleic acid and fumaric acid are particularly preferred.

As $\alpha,\beta$-ethylenically unsaturated dicarboxylic acid monomers maleic acid, fumaric acid, itaconic acid, citraconic acid and mesaconic acid may be used.

As $\alpha,\beta$-ethylenically unsaturated dicarboxylic acid anhydride monomers the anhydrides of the aforementioned maleic acid, fumaric acid, itaconic acid, and citraconic acid may be used.

The content of $\alpha,\beta$-ethylenically unsaturated dicarboxylic acid monoester monomer unit as preferred third monomer (ic) in the nitrile rubber or hydrogenated nitrile rubber is preferably in the range of from 0.5 to 20 wt. %, more preferably in the range of from 1 to 15 wt. %, and particularly preferably in the range of from 1.5 to 10 wt. % with respect to 100 wt. % of all monomer units. If the content of $\alpha,\beta$-ethylenically unsaturated dicarboxylic acid monoester monomer units in the nitrile rubber or the hydrogenated nitrile rubber is too small, this may influence the degree of crosslinking of the vulcanizable polymer composition. On the other hand, if the content is too high, this might influence the fatigue properties of the obtained polymer vulcanizate and might result in residual carboxyl groups remaining after the crosslinking.

Further Copolymerisable Monomers in the Optionally Hydrogenated Nitrile Rubbers:

The optionally hydrogenated nitrile rubber may contain repeating units of other monomer units than those (ia), (ib) and (ic) which can be copolymerised with the various aforesaid monomer units, namely and in particular with the diene monomer, the $\alpha,\beta$-ethylenically unsaturated nitrile monomer, the $\alpha,\beta$-ethylenically unsaturated dicarboxylic acid monoester monomer. As such other monomers, $\alpha,\beta$-ethylenically unsaturated carboxylate esters (other than $\alpha,\beta$-ethylenically unsaturated dicarboxylic acid monoester), aromatic vinyl, fluorine-containing vinyl, $\alpha,\beta$-ethylenically unsaturated monocarboxylic acid, and copolymerisable antiaging agent may be used.

As additional $\alpha,\beta$-ethylenically unsaturated carboxylate ester monomers (other than $\alpha,\beta$-ethylenically unsaturated dicarboxylic acid monoester), for example, alkyl acrylate ester and alkyl methacrylate ester in which the carbon number of the alkyl group is 1-18 such as methyl acrylate, ethyl acrylate, propyl acrylate, butyl acrylate, n-butyl acrylate, n-dodecyl acrylate, methyl methacrylate, ethyl methacrylate and the like; alkoxyalkyl acrylate and alkoxyalkyl methacrylate in which the carbon number of the alkoxyalkyl is 2-12 such as methoxymethyl acrylate, methoxyethyl methacrylate and the like; cyanoalkyl acrylate and cyanoalkyl methacrylate in which the carbon number of the cyanoalkyl group is 2-12 such as $\alpha$-$\alpha$cyanoethyl acrylate, $\beta$-cyanoethyl acrylate, cyanobutyl methacrylate and the like; hydroxyalkyl acrylate and hydroxyalkyl methacrylate in which the carbon number of the hydroxyalkyl group is 1-12 such as 2-hydroxyethyl acrylate, 2-hydroxyethyl methacrylate, 3-hydroxypropyl acrylate and the like; fluorine-substituted benzyl group-containing acrylate and fluorine-substituted benzyl group-containing methacrylate such as fluorobenzyl acrylate, fluorobenzyl methacrylate and the like; fluoroalkyl group-containing acrylate and fluoroalkyl group-containing methacrylate such as trifluoroethyl acrylate, tetrafluoropropyl methacrylate and the like; unsaturated polycarboxylic acid polyalkyl ester other than those monomers encompassed by the monomers (ic) of polymer (i) in the inventive vulcanizable polymer composition; amino group-containing $\alpha,\beta$-ethylenically unsaturated carboxylic acid ester such as dimethylaminomethyl acrylate, diethylaminoethyl acrylate and the like.

As additional aromatic vinyl monomers, styrene, $\alpha,\alpha$-methylstyrene, and vinyl pyridine may be used.

As additional fluorine-containing vinyl monomers, fluoroethyl vinyl ether, fluoropropyl vinyl ether, ortho-fluoromethyl styrene, vinyl pentafluorobenzoate, difluoroethylene, and tetrafluoroethylene may be used.

As additional $\alpha,\beta$-ethylenically unsaturated monocarboxylic acid monomers acrylic acid, and methacrylic acid may be used.

As copolymerisable antiaging agent, N-(4-anilinophenyl) acrylamide, N-(4-anilinophenyl) methacrylamide, N-(4-anilinphenyl) cinnamide, N-(4-anilinophenyl) crotonamide, N-phenyl-4-(3-vinylbenzyloxy) aniline, N-phenyl-4-(4-vinylbenzyloxy) aniline and the like may be proposed.

A plurality of species of these other copolymerisable monomers may be co-used. The content of these other monomer units in the nitrile rubber or hydrogenated nitrile rubber is typically equal to or less than 80 wt. %, more preferably 50 wt. % or less and particularly preferably 10 wt. % or less with respect to 100 wt. % of all the monomer units.

The nitrile rubber may be used in its hydrogenated form. Hydrogenated nitrile rubber typically comprises a residual carbon-carbon double bond unsaturation of less than about 30 mole percent, more preferably from 30 to 0.05 mole percent, even more preferably from 15 to 0.05 mole percent, even more preferably from 10.0 to 0.05 mole percent, even more preferably from 7.0 to 0.05 mole percent, most preferably from 5.5 to 0.05 mole percent.

The hydrogenation of the copolymer can take place in a manner known to a person skilled in the art. Suitable processes for the hydrogenation of nitrile rubbers are for example described in U.S. Pat. No. 3,700,637, DE-PS 2 539 132, EP-A 134023, DE-A 35 40 918, EP-A 298386, DE-A 35 29 252, DE-A 34 33 392, U.S. Pat. No. 4,464,515 and U.S. Pat. No. 4,503,196

Moreover, the Mooney viscosity [ML1+4@100° C.] of the optionally hydrogenated nitrile rubber is preferably 1-200, more preferably 30-150 and particularly preferably 39-120. If the Mooney viscosity of the optionally hydrogenated nitrile rubber is too low, there is a danger of a reduction in the mechanical strength of the obtained rubber crosslinked material being caused and conversely if it is too high, a fall in the processing properties of the obtained crosslinkable rubber composition may result.

The process for the production of the aforesaid nitrile rubber is not restricted in particular. In general, a process in which the α,β-ethylenically unsaturated nitrile monomer, α,β-ethylenically unsaturated dicarboxylic acid monoester monomer, diene monomer or α-olefin monomer, and other monomers that can be copolymerized with these which are added in accordance with requirements, are copolymerised is convenient and preferred. As the polymerisation method, any of the well known emulsion polymerisation methods, suspension polymerisation methods, bulk polymerisation methods and solution polymerisation methods can be used, but the emulsion polymerisation method is preferred due to the simplicity of the control of the polymerisation reaction. If the content of residual carbon-carbon double bonds in the copolymer obtained by copolymerisation is above the aforesaid range, hydrogenation (hydrogen addition reaction) of the copolymer may be performed. Such hydrogenation processes are not restricted in particular, and well known methods may be adopted.

The polymers, preferably these aforementioned elastomers, are well known in the art, either commercially available or may be produced by a person skilled in the art according to processes well described in literature.

Component (ii): Polyamine Crosslinking Agent

The second component (ii) of the present polymer composition is at least one polyamine crosslinking agent to crosslink the aforesaid carboxyl groups of the terpolymer (i). The polyamine crosslinking agent is not restricted in particular as long as the said agent is (1) a compound having two or more amino groups or (2) a species that forms a compound having two or more amino groups during crosslinking in-situ. However, a compound wherein a plurality of hydrogens of an aliphatic hydrocarbon or aromatic hydrocarbon have been replaced by amino groups or hydrazide structures (a structure represented by "—CONHNH$_2$", wherein CO denotes carbonyl group) is preferred.

As examples of polyamine crosslinking agent (ii), for example the following shall be mentioned:

an aliphatic polyamine, preferably hexamethylene diamine, hexamethylene diamine carbamate, tetramethylene pentamine, hexamethylene diamine-cinnamaldehyde adduct, or hexamethylene diamine-dibenzoate salt;

an aromatic polyamine, preferably 2,2-bis (4-(4-aminophenoxy)phenyl) propane, 4,4'-methylenedianiline, m-phenylenediamine, p-phenylenediamine, or 4,4'-methylene bis (o-chloroaniline);

compounds having at least two hydrazide structures, preferably isophthalic acid dihydrazide, adipic acid dihydrazide, or sebacic acid dihydrazide.

Among these, an aliphatic polyamine is preferred, and hexamethylene diamine carbamate is particularly preferred.

The content of the polyamine crosslinking agent (ii) in the vulcanizable polymer composition is in the range of from 0.2 to 20 parts by weight, preferably in the range of from 1 to 15 party by weight, more preferably of from 1.5 to 10 parts by weight based on 100 parts by weight of the polymer (i), preferably the nitrile rubber.

Component (iii): Bi- or Polycyclic Aminic Base

The third component (iii) of the vulcanizable polymer composition according to the present invention is at least one bi- or polycyclic aminic base. Suitable bi- or polycyclic aminic base are known to a person skilled in the art. Preferably, bi- or polycyclic aminic base is selected from the group consisting of 1,8-diazabicyclo[5.4.0]undec-7-ene (DBU), 1,5-diazabicyclo[4.3.0]-5-nonene (DBN), 1,4-diazabicyclo [2.2.2]octane (DABCO), 1,5,7-triazabicyclo[4.4.0]dec-5-ene (TBD), 7-methyl-1,5,7-triazabicyclo[4.4.0]dec-5-ene (MTBD) and its derivatives.

The bi- or polycyclic aminic bases can be prepared by methods known in the art. The preferred bases mentioned in the present invention are commercially available.

In one embodiment of the present invention a bi- or polycyclic aminic base is used having a pK$_b$-value (measured in DMSO) in the range of from −2 to +12.

Component (iv): Antioxidant

A further, but optional component of the present polymer composition is at least one antioxidant. Suitable antioxidants are known by a person skilled in the art. Preferred antioxidants are selected from the group consisting of aminic antioxidants, preferably monofunctional or oligofunctional secondary aromatic amines or sterically hindered amines, and phenolic antioxidants, preferably monofunctional or oligofunctional substituted phenols. More preferably, the antioxidant is selected from alkylated and/or arylated diphenylamines and sterically hindered amines. Most preferably, the antioxidant is selected from the group consisting of 4,4'-bis-(1,1-dimethylbenzyl)-diphenylamine (CDPA), 4,4'-bis(octyl (diphenylamine) (OCD) and 2,2,4-trimethyl-1,2-dihydroquinoline polymerized (TMQ).

Preferably, the antioxidant is present in the polymer composition in an amount of from about 0.5 to about 4 parts by weight per hundred parts by weight of the polymer.

Component (v): Filler

Furtheron the polymer composition according to this invention optionally comprises at least one filler. The nature of the filler is not particularly restricted and the choice of suitable fillers is within the purview of a person skilled in the art. Non-limiting examples of suitable fillers include carbon black (e.g., FEF, MT, GPF and SRF), clays, titanium dioxide, silica fillers (with or without unsaturated silanes) and the like. The amount of filler is not critical and conventional. Preferably, the filler is present in an amount in the range of from about 20 to about 200 parts by weight per hundred parts by weight of the polymer (i), and preferably from about 20 to 130 parts by weight per 100 hundred party by weight of the polymer (i). More preferably, the filler is present in an amount in the range of from about 20 to about 100 parts by weight per hundred parts by weight of the polymer (i). Most preferably, the filler is present in an amount in the range of from about 40 to about 80 parts by weight per hundred parts by weight of the polymer (i).

Other Optional Components:

Other conventional compounding ingredients may also be included into the polymer composition by mixing with the mandatory ingredients (i), (ii) and (iii) in the conventional manner. Such other compounding ingredients are used for their conventional purposes and include activators such as zinc oxide and magnesium oxide, anti-ageing agents; plasticizers; processing aids; reinforcing agents; fillers; promoters and retarders in amounts well known in the art.

Optionally the vulcanizable polymer composition according to the present invention may further comprise one or more additional vulcanizing agents besides the polyamine crosslinking agent (ii). Such additional vulcanization systems are well known in the art and the choice thereof is within the purview of a person skilled in the art.

In one embodiment, an organic peroxide (e.g., dicumyl peroxide or 2,2'-bis(tert-butylperoxy diisopropylbenzene) may be used as additional vulcanizing agent in the polymer composition according to the present invention.

In another embodiment, sulfur or another conventional sulfur-containing vulcanizing agent or even mixtures thereof may be used as additional vulcanizing agent(s) in the polymer composition according to the present invention. Suitable additional sulfur-containing vulcanizing agents are commercially available, e.g. Vulkacit® DM/C (benzothiazyl disulfide), Vulkacit® Thiuram MS/C (tetramethyl thiuram monosulfide), and Vulkacit® Thiuram/C (tetramethyl thiuram disulfide). It may be suitable to even add a further peroxide to such sulfur-based vulcanizing agents like e.g. zinc peroxide.

In yet another embodiment, a reactive phenol-formaldehyde resin and a Lewis acid activator may be used as additional vulcanizing agent in the polymer composition according to the present invention. It is known to those skilled in the art that reactive phenol-formaldehyde resins may be prepared by reacting a para-substituted phenol with a molar excess of formaldehyde—see, for example, U.S. Pat. No. 2,726,224, the contents of which are hereby incorporated by reference as far as permissible under the respective jurisdiction. The use of such phenolformaldehyde resins in vulcanization systems for butyl rubber is e.g. well known. In one particular embodiment of the invention a reactive phenol-formaldehyde resin is used as component of the polymer composition with at least about 3 parts by weight per hundred parts by weight of the polymer (i), preferably the nitrile polymer as polymer (i) besides the polyamine crosslinking agent (ii). It is especially preferred to use from about 8 to about 16 parts by weight of a reactive phenol-formaldehyde resin per hundred parts by weight polymer (i) besides the polyamine crosslinking agent (ii). The Lewis acid activator may be present as a separate component such as stannous chloride ($SnCl_2$) or poly(chlorobutadiene). Alternatively, the Lewis acid activator may be present within the structure of the resin itself—for example, bromomethylated alkyl phenol-formaldehyde resin (which may be prepared by replacing some of the hydroxyl groups of the methylol group of the resin discussed above with bromine). The use of such halogenated resins in vulcanizing agents for butyl rubber is well known to those skilled in the art.

Process for Producing the Vulcanizable Polymer Compositions:

The vulcanizable polymer compositions according to the present invention may be typically prepared by mixing the polymer (i) with at least one polyamine crosslinking agent (ii) and at least one bi- or polycyclic aminic base (iii).

Process for Producing a Polymer Vulcanizate:

In another of its aspects, the present invention provides a process for producing a polymer vulcanizate by vulcanizing at elevated temperature a polymer composition comprising:
(i) a polymer having a main polymer chain derived from
  (ia) at least 25% by weight to 100% by weight, preferably 25 to 85% by weight, more preferably 30 to 80% by weight, particularly preferably 45 to 75% by weight based on the polymer, of a first monomer which introduces at least one of a secondary carbon and a tertiary carbon to the main polymer chain, preferably at least one diene monomer, and
  (ib) in the range of from 0 to 74.9% by weight, or alternatively 10 to 75% by weight, preferably 10 to 60% by weight, more preferably 15 to 55% by weight, particularly preferably 20 to 50% by weight based on the polymer, of at least a second monomer, preferably an α,β-ethylenically unsaturated nitrile monomer;
  (ic) in the range from 0.1 to 20% by weight, preferably 0.5 to 20% by weight, more preferably 1 to 15% by weight, particularly preferably 1.5 to 10% by weight based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;
  wherein the sum of all monomer units mentioned under (ia), (ib) and (ic) is 100% by weight;
(ii) at least one polyamine crosslinking agent, and
(iii) at least one bi- or polycyclic aminic base, which is preferably selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives,
comprising admixing said polymer (i) with at least one polyamine crosslinking agent (ii) and at least one bi- or polycyclic aminic base (iii).

In another embodiment, the present invention provides a process for producing a polymer vulcanizate by vulcanizing at elevated temperature a polymer composition comprising:
(i) a polymer having a main polymer chain derived from
  (ia) at least 25% by weight to 99.9% by weight, preferably 25 to 89.5% by weight based on the polymer, of a first monomer which introduces at least one of a secondary carbon and a tertiary carbon to the main polymer chain, preferably at least one diene monomer, and
  (ib) in the range of from 0 to 74.9% by weight, preferably 10 to 60% by weight based on the polymer, of at least a second monomer, preferably an α,β-ethylenically unsaturated nitrile monomer;
  (ic) in the range from 0.1 to 20% by weight, preferably 0.5 to 20% by weight based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;

wherein the sum of all monomer units mentioned under (ia), (ib) and (ic) is 100% by weight;

(ii) at least one polyamine crosslinking agent, and (iii) at least one bi- or polycyclic aminic base, which is preferably selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives, comprising admixing said polymer (i) with at least one polyamine crosslinking agent (ii) and at least one bi- or polycyclic aminic base (iii).

In another embodiment of the present invention the above outlined process for preparing polymer vulcanizates of the novel polymer compositions additionally involves at least one antioxidant and at least one filler. In yet another embodiment of the present invention the process for preparing polymer vulcanizates of the novel polymer compositions involves not only at least one antioxidant and at least one filler, but additionally at least one further vulcanizing agent.

In such process for preparing the polymer vulcanizates the mixing of the polymer (i), the polyamine crosslinking agent (ii), at least one bi- or polycyclic aminic base, and optionally the antioxidant, the filler and other conventional additives may be performed in any conventional manner known in the art. For example, all components may be admixed on a two-roll rubber mill or an internal mixer. The preferred hydrogenated nitrile terpolymer e.g. used in the present process tends to be quite stiff, and is prone to bag when mixed on a two-roll rubber mill. The addition of a reactive phenol-formaldehyde resin generally improves the mixing of the hydrogenated terpolymer by reducing the bagging problem.

Thus, the polymer composition is mixed and prepared in a conventional manner and the temperature during mixing is maintained as is known in the art. Temperatures in the range of from 80 to 160° C. have proven to be typically applicable, always depending on the specific type of polymer(s) (i) used and other components as chosen.

In a typical embodiment of the present process it is then preferred to heat the polymer composition to form the polymer vulcanizates using conventional procedures also well known in the art. Preferably, the vulcanizable polymer composition is heated to a temperature in the range of from about 130° to about 200° C., preferably from about 140° to about 190° C., more preferably from about 150° to about 180° C.

Preferably, the heating is conducted for a period of from about 1 minutes to about 15 hours, more preferably from about 5 minutes to about 30 minutes.

It is possible and in some cases recommendable to perform a so-called post-curing at temperature in the range of from about 130° to about 200° C., preferably from about 140° to about 190° C., more preferably from about 150° to about 180° C. for a period of up to 15 hours which is performed outside the die, e.g. by placing the vulcanizate, i.e. the respective form part, in a standard oven.

In a further embodiment the present invention relates to a polymer vulcanizate obtainable by the process mentioned before.

Therefore it is an object of the present invention to provide a polymer vulcanizate comprising a polymer (i) having a main polymer chain derived from (ia) at least 25% by weight to 100% by weight, preferably 25 to 85% by weight, more preferably 30 to 80% by weight, particularly preferably 45 to 75% by weight based on the polymer, of a first monomer which introduces at least one of a secondary carbon and a tertiary carbon to the main polymer chain, preferably at least one diene monomer, and (ib) in the range of from 0 to 74.9% by weight, or in the alternative 10 to 75% by weight, preferably 10 to 60% by weight, more preferably 15 to 55% by weight, and particularly preferably 20 to 50% by weight based on the polymer, of at least a second monomer, preferably an α,β-ethylenically unsaturated nitrile monomer;

(ic) in the range from 0.1 to 20% by weight, preferably 0.5 to 20% by weight, more preferably 1 to 15% by weight, particularly preferably 1.5 to 10% by weight based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;

wherein the sum of all monomer units mentioned under (ia), (ib) and (ic) is 100% by weight which polymer (i) contains crosslinking or bridging elements based on a polyamine crosslinking agent and wherein the polymer vulcanizate comprises at least one bi- or polycyclic aminic base, preferably selected from the group consisting of 1,8-diazabicyclo[5.4.0] undec-7-ene (DBU), 1,5-diazabicyclo[4.3.0]-5-nonene (DBN), 1,4-diazabicyclo[2.2.2]octane (DABCO), 1,5,7-triazabicyclo[4.4.0]-dec-5-ene (TPD), 7-methyl-1,5,7-triazabicyclo[4.4.0]dec-5-ene (MTPD) and its derivatives.

In another embodiment the present invention provides a polymer vulcanizate comprising a polymer (i) having a main polymer chain derived from (ia) at least 25% by weight to 99.9% by weight, preferably 25 to 89.9% by weight based on the polymer, of a first monomer which introduces at least one of a secondary carbon and a tertiary carbon to the main polymer chain, preferably at least one diene monomer, and (ib) in the range of from 0 to 74.9% by weight, or in the alternative 10 to 75% by weight, preferably 10 to 60% by weight based on the polymer, of at least a second monomer, preferably an α,β-ethylenically unsaturated nitrile monomer;

(ic) in the range from 0.1 to 20% by weight, preferably 0.5 to 20% by weight based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;

wherein the sum of all monomer units mentioned under (ia), (ib) and (ic) is 100% by weight which polymer (i) contains crosslinking or bridging elements based on a polyamine crosslinking agent and wherein the polymer vulcanizate comprises at least one bi- or polycyclic aminic base, preferably selected from the group consisting of 1,8-diazabicyclo[5.4.0] undec-7-ene (DBU), 1,5-diazabicyclo[4.3.0]-5-nonene (DBN), 1,4-diazabicyclo[2.2.2]octane (DABCO), 1,5,7-triazabicyclo[4.4.0]-dec-5-ene (TPD), 7-methyl-1,5,7-triazabicyclo[4.4.0]dec-5-ene (MTPD) and its derivatives.

This means that the polyamine crosslinking agent gets incorporated into the vulcanizate structure as crosslinking or bridging elements between the polymer chains during the vulcanization, while the bi- or polycyclic aminic base, preferably selected from the aforementioned group of compounds DBU, DBN, DABCO, TBD, MTPD and its derivatives is still present in the vulcanizate.

The process for preparing the aforementioned polymer vulcanizates can be used to prepare any type of mouldings or shaped parts.

EXAMPLES 1-13

Embodiments of the present invention will be illustrated with reference to the following Examples which are provided for illustrative purposes and should not be used to limit the scope of the invention. Unless otherwise stated, all parts in the Examples are parts by weight.

In the Examples the following materials have been used:
Rubber Components:
HNBR 1:
 A hydrogenated nitrile butadiene terpolymer prepared as hereinafter described with an acrylonitrile content of 36.8% by weight, a residual double bound content of 0.4% and a maleic monoethylester content of 4.5% and a Mooney viscosity (ML 1+4@100° C.) of 101.
HNBR 2:
 A hydrogenated nitrile butadiene terpolymer prepared as hereinafter described with an acrylonitrile content of 36.2% by weight, a residual double bound content of 0.5% and a maleic monoethylester content of 3.3% and a Mooney viscosity (ML 1+4@100° C.) of 79.3.
HNBR 3:
 hydrogenated nitrile butadiene polymer prepared as hereinafter described with an acrylonitrile content of 35.5% by weight, a residual double bound content of 0.4% and a fumaric monoethylester content of 4.8% and a Mooney viscosity (ML 1+4@100° C.) of 98.6.
Other Components:
Corax® N 550/30:
 carbon black, FEF (fast extrusion furnace); commercially available from Evonik-Degussa AG.
DABCO:
 1,4-diazabicyclo[2.2.2]octane; commercially available from AIR Products Chemicals Europe.
DIAK No. 1:
 Hexamethylene diamine carbamate; commercially available from DuPont.
Diplast 810:
 Trioctyl/decylmellitate, plasticizer; commercially available from Lonzy SpA., Italy.
Durex® 0/35:
 carbon black, SRF (semi reinforcing furnace); commercially available from Evonik-Degussa AG.
Edenor® C 18 98-100:
 surfactant (Stearic Acid); commercially available from Cognis GmbH.

Luvomaxx® CDPA:
 4,4'-Bis-(1,1-dimethylbenzyl)-diphenylamine; commercially available from Lehmann & Voss.
Maglite® DE:
 magnesium oxide, activator; commercially available from CP Hall.
RHENOGRAN® DOTG-70:
 preparations of 3-di-o-tolyl guanidine (DOTG) with a polymer binder commercially available from Rheinchemie Rheinau Chemie GmbH.
RHENOGRAN® XLA-60 (GE 2014):
 preparations of 1,8-Diazabicyclo[5.4.0]undec-7-en (DBU) with an polymer binder commercially available from Rheinchemie Rheinau Chemie GmbH.
RHENOSIN® W 95:
 Adipic acid diester; plasticizer; commercially available from Rheinchemie Rheinau GmbH.
SILQUEST RC-1 SILANE:
 Organosilane Ester available from Momentive Performance Materials.
Vulkasil® A1:
 Silica filler, medium active; commercially available from Lanxess Deutschland GmbH.
Zinkoxyd Aktiv®:
 activator; fine particles of precipitated zinc oxide; commercially available from Lanxess Deutschland GmbH.

1. Preparation of HNBR 1, HNBR 2 and HNBR 3 by Hydrogenation

The nitrile rubber "NBR" used as starting basis for the hydrogenation to obtain the corresponding HNBRs contained repeating units of acrylonitrile, butadiene and a termonomer in the amounts given in the following Table 1 and had the Mooney Viscosity also mentioned in Table 1.

TABLE 1

| NBR | Butadiene Content [weight %] | Termonomer (iii) | Termonomer (iii) Content [% by weight] | Acrylonitrile Content [% by weight] | Mooney Viscosity (ML 1 + 4 @ 100° C.) |
|---|---|---|---|---|---|
| NBR 1 | 60.4 | Maleic acid monoethyl ester | 4.5 | 37.2 | 35 |
| NBR 2 | 62.2 | Maleic acid monoethyl ester | 3.3 | 36.8 | 31 |
| NBR 3 | 61.6 | Fumaric acid monoethyl ester | 4.8 | 35.9 | 35 |

A 12% total solids solution of NBR 1 in monochlorobenzene ("MCB") as solvent was charged into a high pressure reactor and heated to 138° C. while being agitated at 600 rpm. Once the temperature was stabilized a solution of Wilkinson's catalyst and triphenylphosphine ("TPP") as co-catalyst were introduced and hydrogen was introduced into the vessel to reach a pressure of 85 bar. The reaction was agitated for 4 hrs at which time the hydrogen pressure was released and the reactor cooled to room temperature (~22° C.). The polymer solution was then removed from the reactor and coagulated using either steam or alcohol methods known in the art. The isolated polymer was than dried.

2. Preparation of the Vulcanizable Polymer Compositions

The following procedure was used for each of the Examples 1-15.

The components and the respective amounts thereof used to prepare the vulcanizable polymer compositions of Examples Q 1-Q 15 are given in Table 2, 5, 10 and 13.

All Examples marked by an "CE" represent comparison examples.

The components of the vulcanizable polymer composition were mixed in a Banbury mixer by conventional mixing. The polymer composition was then vulcanized at 180° C. for a period of 20 minutes and a post curing step of 4 h at 175° C.

The tensile stress at rupture ("tensile strength") of the vulcanizates as well as the stress values "M xxx" with "xxx" representing the percentage of elongation based on the length of the original test specimen was determined in accordance with ASTM D412-80.

Hot air aging properties of the vulcanizates were determined in accordance with ASTM-D573-88.

Hardness properties were determined using a Type A Shore durometer in accordance with ASTM-D2240-81.

The determination of the Mooney viscosity (ML 1+4@100° C.) is carried out in accordance with ASTM standard D 1646.

The properties of the unaged vulcanizates obtained are reported in Table 3, 7, 11 and 15. The various hot air aging properties of the vulcanizates are also illustrated in Table 4, 8, 9, 12, 16 and 17.

The properties of the HNBR vulcanizates reported in the following Tables clearly illustrate the superiority of the curing density, improved modulus 100, the hot air aging and significantly improved compression set characteristics of the vulcanizates of the inventive Examples in which either DBU or DABCO is used when compared to the vulcanizates of the Comparison Examples where DOTG is used. Table 7 is particularly instructive in showing the significant improvement in the curing density with the use of DBU, respectively versus the DOTG based combinations (comparison) under the same test conditions. This translates into significant practical advantages in many of the conventional applications of the vulcanizates and, as well in an improvement of the toxicological behavior of the rubber vulcanisate.

TABLE 2

Formulation of vulcanizable polymer compositions, Examples Q1-Q3 (all inventive Examples)

|  |  | Example | | |
|---|---|---|---|---|
|  |  | Q1 | Q2 | Q3 |
| Rubber component |  | parts | parts | parts |
| HNBR1 |  | 100 |  |  |
| HNBR2 |  |  | 100 |  |
| HNBR3 |  |  |  | 100 |
| Other components |  | phr* | phr* | phr* |
| DUREX ® O/35 |  | 60 | 60 | 60 |
| RHENOSIN ® W 95 |  | 5 | 5 | 5 |
| EDENOR ® C 18 98-100 |  | 0.5 | 0.5 | 0.5 |
| LUVOMAXX ® CDPA |  | 1.5 | 1.5 | 1.5 |
| RHENOGRAN ® XLA-60 (GE 2014) |  | 4 | 4 | 4 |
| DIAK NO. 1 |  | 1.25 | 1.25 | 1.25 |

*In the above Table 2 the amounts of all other components are given in "phr", i.e. parts per 100 parts of rubber component

TABLE 3

Physical Properties of the unaged HNBR-Vulcanisates (Examples Q1-Q3)

|  |  | Example | | |
|---|---|---|---|---|
|  |  | Q1 | Q2 | Q3 |
| Hardness ShA | [Shore A] | 72 | 71 | 72 |
| M10 | MPa | 1 | 1 | 0.9 |
| M25 | MPa | 1.8 | 1.8 | 1.7 |
| M50 | MPa | 3.2 | 3.1 | 3 |
| M100 | MPa | 6.9 | 6.2 | 6.3 |
| M300 | MPa | 13.8 | 11.9 | 13.5 |
| Elongation at break | % | 402 | 444 | 341 |
| Tensile strength | MPa | 17.6 | 16.2 | 14.4 |

TABLE 4

Deformation and Compression Set ("CS") at 150° C. and 168 hours in Hot Air of HNBR Vulcanisates, Examples Q1-Q3

|  |  | Example | | |
|---|---|---|---|---|
|  |  | Q1 | Q2 | Q3 |
| Deformation | [%] | 25 | 25 | 25 |
| CS | [%] | 28 | 25 | 35 |

TABLE 5

Formulation of vulcanizable polymer compositions, Examples Q4-Q9

|  | Q4 (CE) | Q5 (CE) | Q6 | Q7 | Q8 | Q9 |
|---|---|---|---|---|---|---|
| Rubber component | parts | parts | parts | parts | parts | parts |
| HNBR 1 | 100 | 100 | 100 | 100 | 100 | 100 |
| Other components | phr* | phr* | phr* | phr* | phr* | phr* |
| RHENOGRAN ® XLA-60 (GE 2014) |  |  | 4 | 4 | 4 | 4 |
| VULKASIL ® A1 |  |  |  |  | 40 | 40 |
| CORAX ® N 550/30 | 40 | 40 | 40 | 40 |  |  |
| RHENOGRAN ® DOTG-70 | 5.8 | 5.8 |  |  |  |  |
| SILQUEST ® RC-1 SILANE |  |  |  |  | 1.5 | 1.5 |
| DIAK NO. 1 | 1.25 | 2.5 | 1.25 | 2.5 | 1.25 | 2.5 |
| DIPLAST ® TM 8-10/ST | 5 | 5 | 5 | 5 | 5 | 5 |
| EDENOR ® C 18 98-100 | 0.5 | 0.5 | 0.5 | 0.5 | 0.5 | 0.5 |
| LUVOMAXX ® CDPA | 1.5 | 1.5 | 1.5 | 1.5 | 1.5 | 1.5 |

*In the above Table 5 the amounts of all Other components are given in "phr", i.e. parts per 100 parts of rubber component

TABLE 6

MDR-values at 175° C. of the HNBR-Vulcanisates, Examples Q4-Q9

| MDR 175° C. | | Q4 (CE) | Q5 (CE) | Q6 | Q7 | Q8 | Q9 |
|---|---|---|---|---|---|---|---|
| S' min | [dNm] | 1.92 | 1.48 | 1.64 | 1.51 | 2.45 | 2.21 |
| S' max | [dNm] | 18.79 | 27.17 | 20.39 | 30.01 | 18.39 | 24.13 |
| Delta S' | dNm | 16.87 | 25.69 | 18.75 | 28.5 | 15.94 | 21.92 |
| TS2*[1] | s | 37.8 | 46.8 | 39.6 | 42 | 48.6 | 55.2 |
| t10*[2] | s | 35.55 | 51.29 | 38.7 | 47.07 | 45.33 | 56.92 |
| t50*[2] | s | 70.77 | 159.54 | 74.18 | 136.08 | 96 | 172.6 |
| t90*[2] | s | 147.09 | 435.03 | 158.7 | 423 | 259.56 | 548.56 |
| t95*[2] | s | 206.79 | 528.47 | 223.95 | 567.3 | 592.38 | 719.64 |

*[1]"TS2" means the time until the Mooney viscosity has increased by two units compared to the starting point.
*"txx" means the time until "xx" percent of curing has occurred.

TABLE 7

Physical Properties of the unaged HNBR-Vulcanisates, Examples Q4-Q9

| | | Q4 (CE) | Q5 (CE) | Q6 | Q7 | Q8 | Q9 |
|---|---|---|---|---|---|---|---|
| Hardness | [Shore A] | 63 | 67 | 67 | 72 | 68 | 65 |
| M10 | MPa | 0.6 | 0.7 | 0.7 | 0.7 | 0.7 | 0.6 |
| M25 | MPa | 1.1 | 1.2 | 1.2 | 1.4 | 1.3 | 1.1 |
| M50 | MPa | 1.6 | 2.2 | 1.9 | 2.7 | 2.2 | 1.8 |
| M100 | MPa | 3.8 | 6.5 | 4.5 | 8.1 | 5.1 | 4.2 |
| M300 | MPa | 22.6 | — | 26 | — | 22 | — |
| Elongation at break | % | 384 | 250 | 289 | 194 | 365 | 293 |
| Tensile strenght | MPa | 29.8 | 26.6 | 25.4 | 22.9 | 32.1 | 25 |

TABLE 8

Physical Properties of the aged HNBR Vulcanizates after 168 h @ 170° C., Examples Q4-Q9

| Air Aging 168 h/170° C. | | Q4 (CE) | Q5 (CE) | Q6 | Q7 | Q8 | Q9 |
|---|---|---|---|---|---|---|---|
| Hardness | [Shore A] | 72 | 76 | 76 | 77 | 69 | 70 |
| M10 | MPa | 0.8 | 1 | 1 | 1 | 0.6 | 0.6 |
| M25 | MPa | 1.7 | 2.2 | 2 | 2.2 | 1.2 | 1.2 |
| M50 | MPa | 3.4 | 4.8 | 3.9 | 4.9 | 2.2 | 2.1 |
| M100 | MPa | 9.7 | — | 10.9 | 15.2 | 5.7 | 5.6 |
| M300 | MPa | — | — | — | — | — | — |
| Elongation at break | % | 125 | 87 | 139 | 124 | 257 | 246 |
| Tensile strenght | MPa | 13.5 | 11.7 | 18.4 | 21.4 | 25 | 24.3 |
| Change (compared to the unaged HNBR Vulcanizates (see Table 7)) | | | | | | | |
| Hardness | [Shore A] | 9 | 9 | 9 | 6 | 1 | 4 |
| M10 | % | 33.3 | 42.9 | 42.9 | 42.9 | −14.3 | 0 |
| M25 | % | 54.5 | 83.3 | 66.7 | 57.1 | −7.7 | 9.1 |
| M50 | % | 112.5 | 118.2 | 105.3 | 81.5 | 0 | 16.7 |
| M100 | % | 155.3 | — | 142.2 | 87.7 | 11.8 | 33.3 |
| M300 | % | — | — | — | — | — | — |
| Elongation at break | % | −67 | −65 | −52 | −36 | −30 | −16 |
| Tensile strenght | % | −54.7 | −56 | −27.6 | −6.6 | −22.1 | −2.8 |

TABLE 9

Deformation and Compression Set ("CS") at 150° C. or 170° C. and 168 hours in Hot Air of HNBR Vulcanisates, Examples Q5 and Q7

| | | Q5 (CE) | Q7 |
|---|---|---|---|
| 168 h/150° C. | | | |
| Deformation | % | 25 | 25 |
| CS | % | 21 | 16 |
| 168 h/170° C. | | | |
| Deformation | % | 25 | 25 |
| CS | % | 24 | 20 |

TABLE 10

Formulation of vulcanizable polymer compositions, Examples Q4 and Q 5 in comparison to Examples Q10 to Q13

| | | Example | | | | | |
|---|---|---|---|---|---|---|---|
| | | Q4 (CE) | Q5 (CE) | Q10 | Q11 | Q12 | Q13 |
| Rubber | | parts | parts | parts | parts | parts | parts |
| HNBR1 | | 100 | 100 | 100 | 100 | 100 | 100 |
| Other Components | | phr | phr | phr | phr | phr | phr |
| RHENOGRAN ® XLA-60 (GE 2014) | | | | 6 | 6 | 6 | 6 |
| VULKASIL ® A1 | | | | | | 40 | 40 |
| CORAX ® N 550/30 | | 40 | 40 | 40 | 40 | | |
| RHENOGRAN ® DOTG-70 | | 5.8 | 5.8 | | | | |
| SILQUEST ® RC-1 SILANE | | | | | | 1.5 | 1.5 |
| DIAK NO. 1 | | 1.25 | 2.5 | 1.25 | 2.5 | 1.25 | 2.5 |
| DIPLAST ® TM 8-10/ST | | 5 | 5 | 5 | 5 | 5 | 5 |
| EDENOR ® C 18 98-100 | | 0.5 | 0.5 | 0.5 | 0.5 | 0.5 | 0.5 |
| LUVOMAXX CDPA | | 1.5 | 1 | 1.5 | 1.5 | 1.5 | 1.5 |

TABLE 11

Physical Properties of the unaged HNBR-Vulcanisates, Examples Q4 and Q5 in comparison to Q10-Q13

| | | Q4 (CE) | Q5 (CE) | Q10 | Q11 | Q12 | Q13 |
|---|---|---|---|---|---|---|---|
| Hardness | [Shore A] | 63 | 67 | 66 | 69 | 67 | 65 |
| M10 | MPa | 0.6 | 0.7 | 0.6 | 0.7 | 0.7 | 0.6 |
| M25 | MPa | 1.1 | 1.2 | 1.2 | 1.4 | 1.2 | 1.1 |
| M50 | MPa | 1.6 | 2.2 | 1.9 | 2.6 | 2 | 1.7 |
| M100 | MPa | 3.8 | 6.5 | 4.5 | 7.7 | 4.2 | 3.7 |
| M300 | MPa | 22.6 | — | 26.1 | — | 22 | 26.2 |

TABLE 11-continued

Physical Properties of the unaged HNBR-Vulcanisates, Examples Q4 and Q5 in comparison to Q10-Q13

|  |  | Q4 (CE) | Q5 (CE) | Q10 | Q11 | Q12 | Q13 |
|---|---|---|---|---|---|---|---|
| Elongation at break | % | 384 | 250 | 309 | 215 | 395 | 319 |
| Tensile strenght | MPa | 29.8 | 26.6 | 27.2 | 26.7 | 42.2 | 30.4 |

TABLE 12

Deformation and Compression Set ("CS") at 150° C. or 170° C. after 168 hours in Hot Air of HNBR Vulcanisates, Examples Q5 and Q11

|  |  | Q5 (CE) | Q11 |
|---|---|---|---|
| 168 h/150° C. |  |  |  |
| Deformation | % | 25 | 25 |
| CS | % | 21 | 16 |
| 168 h/170° C. |  |  |  |
| Deformation | % | 25 | 25 |
| CS | % | 24 | 22 |

TABLE 13

Formulation of vulcanizable polymer compositions, Examples Q14 and Q15

|  | Examples | |
|---|---|---|
|  | Q14 | Q15 (CE) |
| Rubber | parts | parts |
| HNBR 3 | 100 | 100 |
| Other Components | phr | phr |
| CORAX ® N 550 | 40 | 40 |
| DIPLAST TM 8-10/ST | 5 | 5 |
| EDENOR ® C 18 98-100 | 0.5 | 0.5 |
| LUVOMAXX ® CDPA | 1.5 | 1.5 |
| DIAK No. 1 | 2.5 | 2.5 |
| DABCO | 4 |  |
| RHENOGRAN ® DOTG-70 |  | 5.8 |

TABLE 14

MDR-values at 175° C. of the HNBR-Vulcanisates, Examples Q14-15

| Curing Properties (MDR) |  | Q14 | Q15 (CE) |
|---|---|---|---|
| Measuring time | [min] | 30 |  |
| S'min | [dNm] | 2.0 | 1.8 |
| S'max | [dNm] | 23.1 | 21.5 |
| Delta S' | [dNm] | 21.2 | 19.8 |
| TS2 | [s] | 62.4 | 53.4 |
| t50 | [s] | 253.1 | 205.4 |
| t90 | [s] | 860.0 | 650.6 |
| t95 | [s] | 1111.9 | 838.3 |

TABLE 15

Physical Properties of the unaged HNBR-Vulcanisates, Examples Q14-15

| Physical Properties | Vulcanisate | Q14 | Q15 (CE) |
|---|---|---|---|
| Hardness Shore A | [Shore A] | 69 | 66 |
| M10 | [MPa] | 0.7 | 0.7 |
| M25 | [MPa] | 1.4 | 1.2 |
| M50 | [MPa] | 2.5 | 2.2 |
| M100 | [MPa] | 7.6 | 6.2 |
| Elongation at break | % | 242 | 251 |
| Tensile strength | [MPa] | 27 | 24.1 |

TABLE 16

Deformation and Compression Set ("CS") at 160° C. or 170° C. and 168 hours in Hot Air of HNBR Vulcanisates, Examples Q14-15

|  |  | Q14 | Q15 (CE) |
|---|---|---|---|
| Compression Set at 160° C./168 h | | | |
| Deformation | % | 25 | 25 |
| C.S. | % | 29 | 35 |
| Compression Set at 170° C./168 h | | | |
| Deformation | % | 25 | 25 |
| C.S. | % | 34 | 37 |

TABLE 17

Physical Properties of the aged HNBR Vulcanizates after 168 h@170° C., Examples Q14-15

| Hot air ageing | 170° C./168 h | Q14 | Q15 (CE) |
|---|---|---|---|
| Hardness Shore A | [Shore A] | 76 | 76 |
| M10 | [MPa] | 1.1 | 1 |
| M25 | [MPa] | 2.4 | 2.3 |
| M50 | [MPa] | 5.6 | 5.2 |
| M100 | [MPa] |  |  |
| Elongation at break | % | 87 | 76 |
| Tensile strenght | [MPa] | 13.8 | 9.6 |
| Change (compared to the unaged HNBR Vulcanizates (see Table 15)) | | | |
| Hardness | [Shore A] | 7 | 10 |
| M10 | % | 57.1 | 42.9 |
| M25 | % | 71.4 | 91.7 |
| M50 | % | 124 | 136.4 |
| M100 | % |  |  |
| Elongation at break | % | −64 | −70 |
| Tensile strenght | % | −48.9 | −60.2 |

What is claimed is:

1. A vulcanizable polymer composition comprising
   (i) a polymer having a main polymer chain derived from
      (ia) at least 25 to 99.9% by weight, based on the polymer, of one diene monomer,
      (ib) in the range of from 0 to 74.9% by weight, based on the polymer, of at least α,β-ethylenically unsaturated nitrile monomer; and
      (ic) in the range of from 0.1 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, wherein the sum of all monomer units mentioned under (ia), (ib) and (ic) is 100% by weight;
(ii) at least one polyamine crosslinking agent, and
(iii) at least one bi- or polycyclic aminic base which is selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO), 1,5,7-triazabicyclo[4.4.0]dec-5-ene (TBD), 7-methyl-1,5,7-triazabicyclo[4.4.0]dec-5-ene (MTBD) and its derivatives.

2. The vulcanizable polymer composition according to claim 1 comprising
(i) a polymer having a main polymer chain derived from
(ia) at least 25 to 99.9% by weight, based on the polymer, of one diene monomer,
(ib) in the range of from 0 to 74.9% by weight, based on the polymer, of an α,β-ethylenically unsaturated nitrile monomer, and
(ic) in the range of from 0.1 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer,
wherein the sum of all monomer units mentioned under (ia), (ib) and (ic) is 100% by weight;
(ii) at least one polyamine crosslinking agent, and
(iii) at least one bi- or polycyclic aminic base which is selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

3. The vulcanizable polymer composition according to claim 1 comprising
(i) a polymer having a main polymer chain derived from
(ia) at least 25 to 89.5% by weight based on the polymer, of one diene monomer,
(ib) in the range of from 10 to 60% by weight based on the polymer, of at least a second monomer, and
(ic) in the range of from 0.5 to 20% by weight based on the polymer of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer,
wherein the sum of all monomer units mentioned under (ia), (ib) and (ic) is 100% by weight;
(ii) at least one polyamine crosslinking agent, and
(iii) at least one bi- or polycyclic aminic base which is selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

4. The vulcanizable polymer composition according to claim 1 additionally comprising at least one antioxidant as component (iv) and at least one filler as component (v).

5. The vulcanizable polymer composition according to claim 1 comprising
(i) an polymer having a main chain derived from
(ia) at least one conjugated diene,
(ib) at least 10 to 60% by weight of one α,β-unsaturated nitrile monomer, and
(ic) at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as third monomer,
(ii) at least one polyamine crosslinking agent,
(iii) at least one bi- or polycyclic aminic base, selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives,
(iv) optionally at least one antioxidant, and
(v) optionally at least one filler,
wherein the polymer is optionally hydrogenated.

6. The vulcanizable polymer composition according to claim 5 wherein the optionally hydrogenated nitrile polymer is derived from
(ia) at least one conjugated diene with a carbon number of at least 4, or at least one non-conjugated diene with a carbon number in the range of from 5 to 12,
(ib) at least one α,β-ethylenically unsaturated nitrile, and
(ic) at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer (ic).

7. The vulcanizable polymer composition according to claim 6 wherein the optionally hydrogenated nitrile polymer is derived from
(ia) at least one conjugated diene selected from the group consisting of 1,3-butadiene, isoprene, and 2,3-dimethyl-1,3-butadiene, or at least one non-conjugated diene selected from the group consisting of 1,3-pentadiene, 1,4-pentadiene and 1,4-hexadiene,
(ib) at least one α,β-ethylenically unsaturated nitrile selected from the group consisting of acrylonitrile, α-chloro acrylonitrile, α-bromo acrylonitrile, methacrylonitrile and ethacrylonitrile, and
(ic) at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer (ic).

8. The vulcanizable polymer composition according to claim 1, wherein the organic group of the α,β-ethylenically unsaturated dicarboxylic acid monoester monomer or α,β-ethylenically unsaturated dicarboxylic acid diester monomer which is bonded to the carbonyl group via an oxygen atom, represents an alkyl group, cycloalkyl group, alkyl cycloalkyl group or an aryl group.

9. The vulcanizable polymer composition according to claim 8, wherein the organic group of the α,β-ethylenically unsaturated dicarboxylic acid monoester monomer or α,β-ethylenically unsaturated dicarboxylic acid diester monomer which is bonded to the carbonyl group via an oxygen atom, represents an alkyl group, wherein the carbon number of the alkyl group is in the range of from 1 to 10, a cycloalkyl group, wherein the carbon number of the cycloalkyl group is in the range of from 5 to 12, an alkyl cycloalkyl group, wherein the carbon number of the alkyl cycloalkyl group is in the range of from 6 to 12 or an aryl group wherein the carbon number of the aryl group is in the range of from 6 to 20.

10. The vulcanizable polymer composition according to claim 8, wherein the organic group of the α,β-ethylenically unsaturated dicarboxylic acid monoester monomer or α,β-ethylenically unsaturated dicarboxylic acid diester monomer which is bonded to the carbonyl group via an oxygen atom, represents an alkyl group, wherein the carbon number of the alkyl group is 2, 3, 4, 5 or 6, a cycloalkyl group, wherein the carbon number of the cycloalkyl group is in the range of from 6 to 10, an alkyl cycloalkyl group, wherein the carbon number of the alkyl cycloalkyl group is in the range of from 7 to 10 or an aryl group wherein the carbon number of the aryl group is in the range of from 6 to 14.

11. The vulcanizable polymer composition according to claim 1, wherein at least one monomer selected from the following group is used as α,β-ethylenically unsaturated dicarboxylic acid monoester monomer (ic), said group consisting of
    maleic acid monoalkyl esters,
    maleic acid monocycloalkyl esters,
    maleic acid monoalkylcycloalkyl esters,
    maleic acid monoaryl ester,
    maleic acid mono benzyl ester,
    fumaric acid monoalkyl esters,
    fumaric acid monocycloalkyl esters,
    fumaric acid monoalkylcycloalkyl esters,
    fumaric acid monoaryl ester,
    fumaric acid mono benzyl ester,
    citraconic acid monoalkyl esters,
    citraconic acid monocycloalkyl esters,
    citraconic acid monoalkylcycloalkyl esters,
    citraconic acid mono aryl ester,
    citraconic acid mono benzyl ester,
    itaconic acid mono alkyl esters,
    itaconic acid monocycloalkyl esters,
    itaconic acid monoalkylcycloalkyl esters
    itaconic acid mono aryl ester,
    itaconic acid mono benzyl ester, and
    mesaconic acid monoalkyl ester.

12. The vulcanizable polymer composition according to claim 11, wherein said group consists of
    monomethyl maleate, monoethyl maleate, monopropyl maleate, mono n-butyl maleate,
    monocyclopentyl maleate, monocyclohexyl maleate, monocycloheptyl maleate,
    monomethylcyclopentyl maleate, monoethylcyclohexyl maleate,
    monophenyl maleate,
    monobenzyl maleate,
    monomethyl fumarate, monoethyl fumarate, monopropyl fumarate, mono n-butyl fumarate,
    monocyclopentyl fumarate, monocyclohexyl fumarate, monocycloheptyl fumarate,
    monomethylcyclopentyl fumarate, monoethylcyclohexyl fumarate,
    monophenyl fumarate,
    monobenzyl fumarate,
    monomethyl citraconate, monoethyl citraconate, monopropyl citraconate, mono n-butyl citraconate,
    monocyclopentyl citraconate, monocyclohexyl citraconate, monocycloheptyl citraconate,
    monomethylcyclopentyl citraconate, monoethylcyclohexyl citraconate,
    monophenyl citraconate,
    monobenzyl citraconate,
    monomethyl itaconate, monoethyl itaconate, monopropyl itaconate, mono n-butyl itaconate,
    monocyclopentyl itaconate, monocyclohexyl itaconate, monocycloheptyl itaconate,
    monomethylcyclopentyl itaconate, monoethylcyclohexyl itaconate,
    monophenyl itaconate,
    monobenzyl itaconate, and
    mesaconic monoethyl ester.

13. The vulcanizable polymer composition according to claim 1, wherein the at least one α,β-ethylenically unsaturated dicarboxylic acid monomer is selected from the group consisting of maleic acid, fumaric acid, itaconic acid, citraconic acid and mesaconic acid.

14. The vulcanizable polymer composition according to claim 1, wherein the at least one α,β-ethylenically unsaturated dicarboxylic acid anhydride monomer is selected from the group consisting of the anhydrides of maleic acid, fumaric acid, itaconic acid, and citraconic acid.

15. The vulcanizable polymer composition according to claim 1, wherein the polymer is optionally hydrogenated and additionally contains repeating units of at least one other copolymerizable monomer unit than those (ia), (ib) and (ic).

16. The vulcanizable polymer composition according to claim 15, wherein the optionally hydrogenated polymer additionally contains repeating units of α,β-ethylenically unsaturated carboxylate esters other than α,β-ethylenically unsaturated dicarboxylic acid monoesters.

17. The vulcanizable polymer composition according to claim 15, wherein the optionally hydrogenated polymer additionally contains repeating units of at least one other copolymerizable monomer unit than those (ia), (ib) and (ic) selected from the group consisting of repeating units of n-butyl acrylate, aromatic vinyl monomers, fluorine-containing vinyl monomers, and copolymerisable antiaging agents.

18. The vulcanizable polymer composition according to claim 1, wherein the polyamine crosslinking agent (ii) is selected from the group consisting of an aliphatic polyamine, an aromatic polyamine, and compounds having at least two hydrazide structures.

19. The vulcanizable polymer composition according to claim 18, wherein the polyamine crosslinking agent (ii) is selected from the group consisting of hexamethylene diamine, hexamethylene diamine carbamate, tetramethylene pentamine, hexamethylene diamine-cinnamaldehyde adduct, hexamethylene diamine-dibenzoate salt, 2,2-bis (4-(4-aminophenoxy)phenyl) propane, 4,4'-methylenedianiline, m-phenylenediamine, p-phenylenediamine, 4,4'-methylene bis (o-chloroaniline), isophthalic acid dihydrazide, adipic acid dihydrazide, and sebacic acid dihydrazide.

20. A process for preparing a vulcanizable polymer composition in accordance with claim 1 comprising mixing the polymer (i) with at least one polyamine crosslinking agent (ii) and at least one bi- or polycyclic aminic base (iii).

21. A process for preparing a polymer vulcanizate by vulcanizing at elevated temperature a polymer (i) having a main polymer chain derived from
    (ia) at least 25% by weight to 99.9% by weight, based on the polymer, of one diene monomer,
    (ib) in the range of from 0 to 74.9% by weight, based on the polymer, of at least a second monomer, and
    (ic) in the range from 0.1 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;

wherein the sum of all monomer units mentioned under (ia), (ib) and (ic) is 100% by weight with at least one polyamine crosslinking agent (ii), and at least one bi- or polycyclic aminic base (iii) selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

22. The process according to claim 21 comprising vulcanizing at elevated temperature a polymer (i) having a main polymer chain derived from
   (ia) at least 25 to 89.5% by weight, based on the polymer, of one diene monomer,
   (ib) in the range of from 10 to 60% by weight, based on the polymer, of at least a second monomer, and
   (ic) in the range from 0.5 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;
   wherein the sum of all monomer units mentioned under (ia), (ib) and (ic) is 100% by weight with at least one polyamine crosslinking agent (ii), and at least one bi- or polycyclic aminic base (iii) selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

23. The process according to claim 21 comprising vulcanizing at elevated temperature a polymer (i) having a main polymer chain derived from
   (ia) at least 25% by weight to 99.9% by weight, based on the polymer, of at least one diene monomer,
   (ib) in the range of from 0 to 74.9% by weight, based on the polymer, of at least one α,β-ethylenically unsaturated nitrile monomer, and
   (ic) in the range from 0.1 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;
   wherein the sum of all monomer units mentioned under (ia), (ib) and (ic) is 100% by weight with at least one polyamine crosslinking agent (ii), and at least one bi- or polycyclic aminic base (iii) selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

24. The process according to claim 21, comprising that at least one antioxidant and at least one filler and optionally at least one further vulcanizing agent is added for the vulcanization.

25. A polymer vulcanizate comprising a polymer (i) having a main polymer chain derived from
   (ia) at least 25% by weight to 99.9% by weight, based on the polymer, of one diene monomer,
   (ib) in the range of from 0 to 74.9% by weight, based on the polymer, of at least a second monomer, and
   (ic) in the range from 0.1 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;
   wherein the sum of all monomer units mentioned under (ia), (ib) and (ic) is 100% by weight, which polymer (i) contains crosslinking or bridging elements based on a polyamine crosslinking agent (ii) and wherein the polymer vulcanizate comprises at least one bi- or polycyclic aminic base selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

26. The polymer vulcanizate according to claim 25, comprising a polymer (i) having a main polymer chain derived from
   (ia) at least 25 to 89.5% by weight, based on the polymer, of one diene monomer,
   (ib) in the range of from 10 to 60% by weight, based on the polymer, of at least a second monomer, and
   (ic) in the range from 0.5 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;
   wherein the sum of all monomer units mentioned under (ia), (ib) and (ic) is 100% by weight which polymer (i) contains crosslinking or bridging elements based on a polyamine crosslinking agent (ii) and wherein the polymer vulcanizate comprises at least one bi- or polycyclic aminic base selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

27. The polymer vulcanizate according to claim 25 comprising a polymer (i) having a main polymer chain derived from
   (ia) at least 25% by weight to 99.9% by weight, based on the polymer, of at least one diene monomer,
   (ib) in the range of from 0 to 74.9% by weight, based on the polymer, of at least one α,β-ethylenically unsaturated nitrile monomer, and
   (ic) in the range from 0.1 to 20% by weight, based on the polymer, of at least one α,β-ethylenically unsaturated dicarboxylic acid monoester monomer, α,β-ethylenically unsaturated dicarboxylic acid monomer, α,β-ethylenically unsaturated dicarboxylic acid anhydride monomer or α,β-ethylenically unsaturated dicarboxylic acid diester as a third monomer, preferably at least one α,β-ethylenically unsaturated dicarboxylic acid monoester monomer;

wherein the sum of all monomer units mentioned under (ia), (ib) and (ic) is 100% by weight which polymer (i) contains crosslinking or bridging elements based on a polyamine crosslinking agent and wherein the polymer vulcanizate comprises at least one bi- or polycyclic aminic base selected from the group consisting of 1,8-diazabicyclo[5.4.0]undec-7-ene (DBU), 1,5-diazabicyclo[4.3.0]-5-nonene (DBN), 1,4-diazabicyclo[2.2.2]octane (DABCO) 1,5,7-triazabicyclo[4.4.0]dec-5-ene (TBD), 7-methyl-1,5,7-triazabicyclo[4.4.0]dec-5-ene (MTBD) and its derivatives.

28. The polymer vulcanizate according to claim 25 in the form of a moulding or a shaped part.

29. The process according to claim 22, comprising that at least one antioxidant and at least one filler and optionally at least one further vulcanizing agent is added for the vulcanization.

30. The process according to claim 23, comprising that at least one antioxidant and at least one filler and optionally at least one further vulcanizing agent is added for the vulcanization.

31. The polymer vulcanizate according to claim 26 in the form of a moulding or a shaped part.

32. The polymer vulcanizate according to claim 27 in the form of a moulding or a shaped part.

* * * * *